United States Patent
Hanakawa

[11] Patent Number: 6,162,004
[45] Date of Patent: Dec. 19, 2000

[54] CARGO HANDLING SYSTEM

[75] Inventor: Hiroshi Hanakawa, Sakura, Japan

[73] Assignees: Hanaoka Sharyo Ltd.; Hisao Yoshimi; Hiroshi Iwamoto, all of, Japan

[21] Appl. No.: 09/451,707

[22] Filed: Dec. 1, 1999

[51] Int. Cl.[7] .......................... B65D 88/12; B65D 19/42
[52] U.S. Cl. ...................... 414/389; 414/343; 414/344; 280/79.3; 280/79.11
[58] Field of Search .................... 414/340, 343, 414/344, 345, 398, 389; 280/79.11, 79.3

[56] References Cited

U.S. PATENT DOCUMENTS

| | | | |
|---|---|---|---|
| 1,792,055 | 2/1931 | Young | 414/389 X |
| 3,206,053 | 9/1965 | Bridge | 414/343 X |
| 3,633,774 | 1/1972 | Lee | 280/79.11 X |
| 3,861,704 | 1/1975 | De Witte | 280/79.3 |
| 4,354,791 | 10/1982 | Antonellis | 414/343 |
| 5,320,475 | 6/1994 | Pinder | 414/343 |

FOREIGN PATENT DOCUMENTS 7604507  11/1976  Netherlands ........................ 414/389

*Primary Examiner*—Steven A. Bratlie
*Attorney, Agent, or Firm*—Lorusso & Loud

[57] ABSTRACT

A system for handling and transporting cargo includes a container supported by wheels mounted on detachable casterboards fitted within casterboard holders provided on the bottom wall of the container. The system also includes an apparatus that elevates the container body so that the casterboards are free to slide into and out of the casterboard holders and thus the casterboards may be attached to and detached from the container.

9 Claims, 25 Drawing Sheets

FIG. 20 (a)
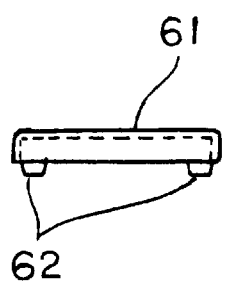
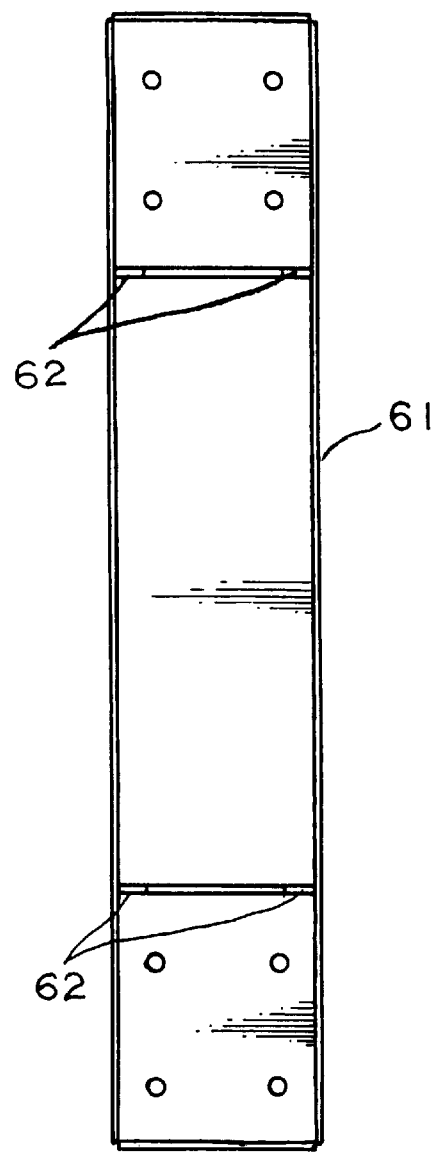
FIG. 20 (b)
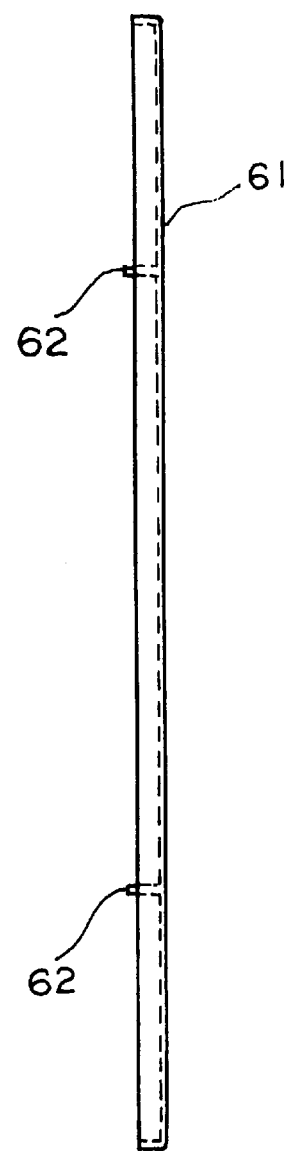
FIG. 20 (c)

CARGO HANDLING SYSTEM

BACKGROUND OF THE INVENTION

The present invention relates to a cargo handling system for transporting and handling of cargo and to a cargo container for use in the cargo handling system.

Various types of cargo containers are commonly used. Among such containers relatively small sized containers are mainly used for sorting and storage of cargo in a warehouse. Some of such small sized containers have wheels on their bottoms for short distance movement by hand (human power), rather than a forklift truck. In the case of containers to be loaded on a truck or trailer, wheels fixed to the bottom, with bolts; and nuts or by other known means, present the following problems:

(1) Due to the height of the wheels on the bottom, some space is killed where such wheeled containers are stored, e.g., in a storage rack, a large sized container or a truck.

(2) The wheels on the bottom reduce stability of the container itself in a storage area or a transportation vehicle.

(3) The wheels on the bottom may be an obstacle to compatibility with other systems, equipment or facilities that may accept these containers. Containers with wheels fixed to their bottom walls are apt to be unstable in a storage rack or a display stand, for example, which may lead to unexpected movement therein.

Because of such problems, use of cargo containers with wheels fixed to their bottoms may necessitate piece-by-piece transfer of cargo to another container that better serves the purpose. Piece-by-piece transfer of cargo to another container not only requires much time and human resources but can also cause damage to cargo packages. The expenses of piece-by-piece transfer and packaging for protection against damage result in a high cost for transportation of cargo.

Cargo shipments to be carried by air must be transported to an airport or airport-related facility for preparation for airlift. Transportation of air cargo to such facilities is done by truck in most cases, and cargoes are loaded in trucks loose or packed in various types of containers. Cargoes are then carried to an airport or airport-related facility where they are unloaded from trucks or containers piece-by-piece and then put in "air cargo containers," again piece by piece, because containers used for transportation by truck can not be fitted to an air carriage for the following reasons:

1. The height of such containers exceeds aircraft cargo compartments in most cases.

2. Only "air cargo containers" that meet particular technical requirements are used for air transportation.

3. The incompatibility between "air cargo containers" and other containers has not been solved.

SUMMARY OF THE INVENTION

Accordingly, it is an object of the present invention to provide a container system good for all phases of handling and transporting cargo, eliminating piece-by-piece transfer of cargo from one container to another.

In accomplishing the above-mentioned object, the present invention provides (1) a cargo container system comprising a cargo container supported at its bottom wall by detachable casterboards on which wheels are mounted, and an apparatus attaching the casterboards to and detaching them from the bottom of the cargo container, and (2) a cargo container having on its bottom wall casterboard holders which hold casterboards on which wheels are mounted.

With the present invention, need for piece-by-piece transfer of cargo from one container to another is avoided. Cargo packed in a container as provided by the present invention may be stored in a warehouse, carried by various types of transportation equipment or vehicles, and handled while the cargo itself is left undisturbed in that container. Thus easy, quick and cost-saving transportation and handling of cargo is realized.

Thus, the present invention provides a cargo handling system including a cargo container having a bottom wall and side walls with a casterboard holder on the bottom wall for detachably holding a casterboard, having at least two wheels, under the weight of the cargo container. The system further includes a ramp for receiving the cargo container and providing an inclined support for the cargo container whereby the cargo container can be elevated and supported with the casterboards free of the weight of the cargo container to allow for removal thereof. The ramp delivers the cargo container free of casterboards to a conveyor.

In a preferred embodiment the cargo handling system has the inclined support of the ramp formed of a pair of rails, each rail having plural roller members which engage the bottom wall of the cargo container or, in a preferred embodiment, a lip of the casterboard holder. It is also preferred that the ramp be provided with at least one fixed stopper for engaging and stopping the casterboard in movement of the cargo container on the ramp, toward the conveyor, whereby movement of the cargo container toward the conveyor serves to separate the casterboards from the casterboard holders.

In a preferred embodiment the casterboard holders each hold a casterboard in a first position with the weight of the cargo container on the casterboard wherein the casterboard is locked against sliding movement relative to the casterboard holder. The casterboard holders each also serve to hold the casterboard in a second position with the casterboard suspended therefrom, free of the weight of the cargo container. The second position of the casterboard is vertically below, relative to the casterboard holder, the first position and allows for sliding movement of the casterboard relative to the casterboard holder. Preferably, the casterboard holder is an elongated bracket defining an elongated channel for slidably receiving a casterboard. The elongated bracket includes a first elongated portion running along and fixed to the bottom wall of the cargo container and a second elongated portion, opposite the first elongated portion, wherein the second elongated portion has a slot at least partially coextensive therewith for accommodating holders of the wheels of the casterboard.

In a preferred embodiment the casterboard has raised positions at opposing ends, opposite the wheels. In this preferred embodiment the elongated bracket includes an elongated protrusion extending from the first elongated portion and terminating spaced from opposing ends of the first elongated portion to define a space at each of the opposing ends, the raised portions of the casterboard seating within the spaces when the casterboard is in the aforementioned first position.

The container of the present invention may be any type of container which accommodates cargo packages and which is adaptable to a casterboard holder as provided by the present invention it may be made of steel, aluminum, or other material. It may be constructed of plates, bars, pipes, or other shaped parts. In other words, it may be a cage container, open container, or closed box container. Also, it may be a refrigeration container or other special purpose container.

The word "Cargo" as used herein means any cargo pieces that may be accommodated in the container used in the present invention.

The container system and container provided by the present invention are also well suited for transportation of cargo by air.

BRIEF DESCRIPTION OF THE DRAWINGS

Further objects, features and advantages of the present invention will become apparent upon reading the following detailed description in conjunction with the accompanying drawings, in which:

FIG. 20(b) is a plan view of another embodiment of a casterboard according to the present invention, FIG. 20(a) is a front view of the casterboard shown in FIG. 20(b) and FIG. 20(c) is a side view of the same casterboard;

DESCRIPTION OF PREFERRED EMBODIMENTS

Figure 1:
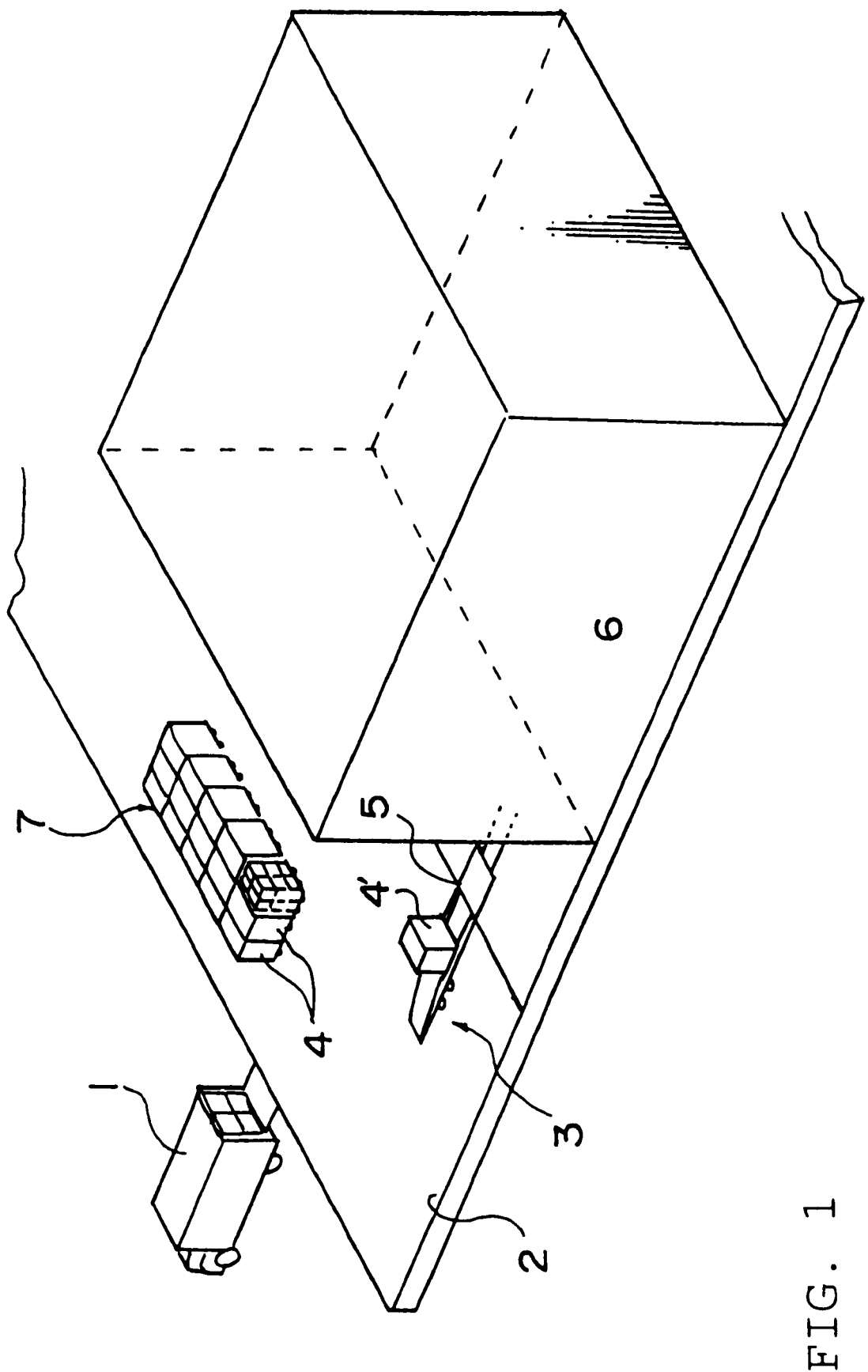
FIG. 1 is a perspective view of a cargo facility incorporating the system of the present invention.

The system and apparatus of the present invention, as used in a cargo facility is illustrated in FIG. 1.

FIG. 1 shows cargo containers 4 unloaded from a truck 1 arranged on a platform 2 of the cargo facility. In the arrangement shown in FIG. 1 each cargo container 4 is supported by casterboards 21 on which caster wheels 22 are mounted. The cargo container 4' is shown on an apparatus 3 where the casterboards have been detached from the cargo container 4'. The cargo container 4' without casterboards is guided onto the apparatus 5 for further transfer to the facility 6, which may be storage racks, transporting equipment, showcase shelves, or any other storage structure. Cargo containers 4' which are retrieved from the facility 6 for transfer to a truck 1 are handled in the reverse order.

Figure 26:
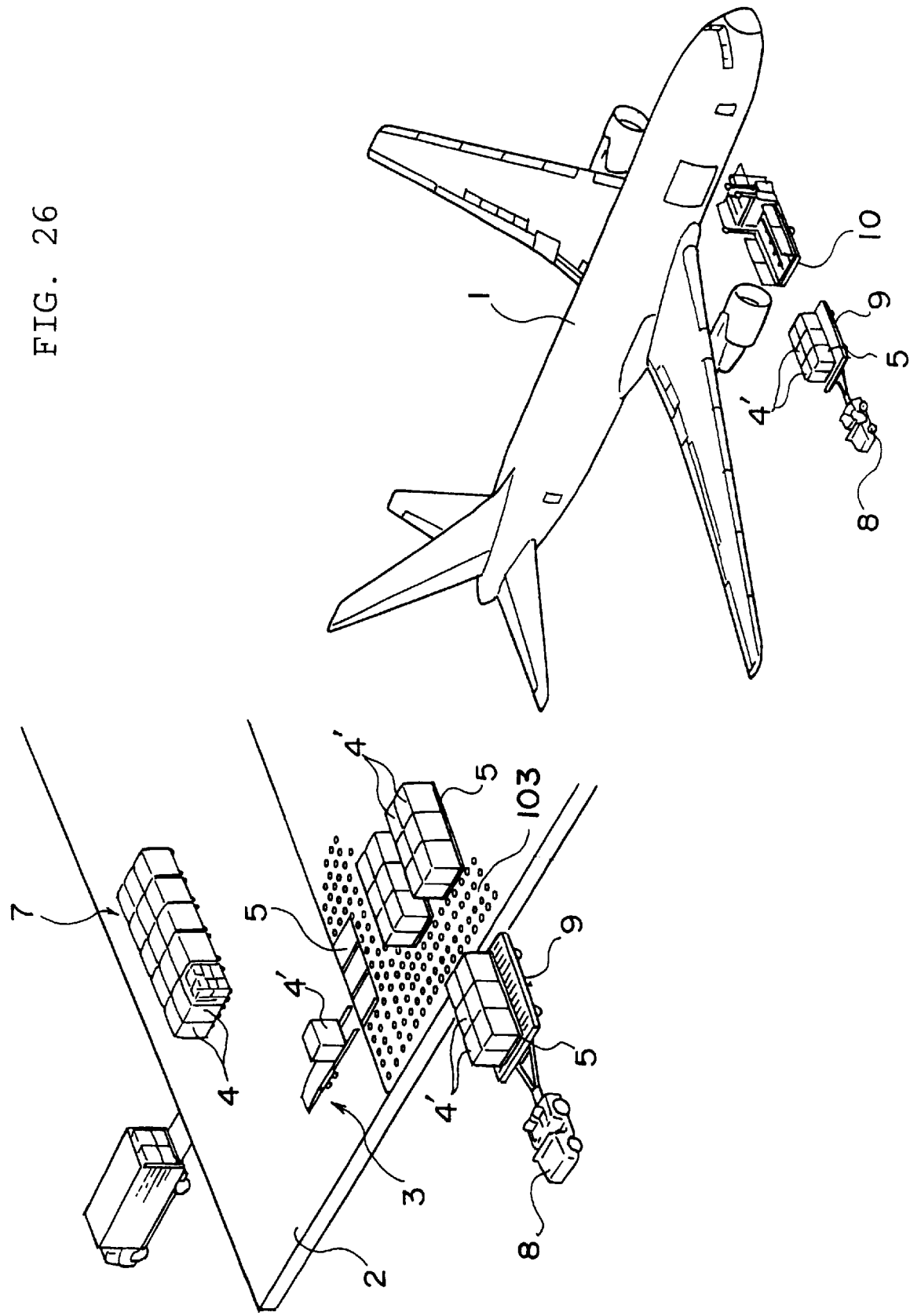
FIG. 26 illustrates an air cargo system in accordance with the present invention.

Alternatively, the system and apparatus of the present invention may be adapted to an air cargo facility as shown in FIG. 26. As shown in FIG. 26, containers loaded with air cargo are loaded into a cargo compartment of an aircraft 101 in the following steps in sequence.

1. Containers 4 loaded with air cargo are carried to an airport or airport-related facility by truck 1 or other transportation means and put on a platform 2 therein.
2. Being equipped with casterboards having wheels, the cargo containers 4 are moved manually within the cargo handling facility.
3. Casterboards 21 are detached from the cargo container using the apparatus 3 and the cargo containers 4' without casterboards are put on an air cargo pallet 5 supported on a conveyor 103 which allows easy positioning of the cargo containers 4' which do not have casterboards.
4. While FIG. 26 shows six cargo containers 4' on an air cargo pallet 5, any number of cargo containers may be put on one air cargo pallet and the air cargo pallet may optionally have side, end and ceiling panels to form a container.
5. The conveyor 103 is a roller surface platform which allows manual movement of the air cargo pallet 5 and leads it to a dolly 9 for transportation to an aircraft 101.
6. The air cargo pallet 5 loaded with cargo containers 4' is transferred to a pallet dolly 9 which will be pulled to a container/pallet loader 10 for loading onto the aircraft 101.

7. Cargo containers 4' off-loaded from an aircraft are handled in the reverse order.

The cargo container body 11 consists of a base panel 12 and side panels 13, 14 and 15 set up along the edge of base panel 12. Each side panel consists of bars 20 supported by an outer frame 19. The bars 20 and outer frames 19 may be made of aluminum pipes, wooden bars, fiberboard carbon pipes, stainless steel pipes, or other material. The base panel 12 and side panels 13, 14 and 15 form a container to hold cargo therein. Each side panel 13, 14 and 15 is provided with three lateral stiffeners 18.

Figure 2:
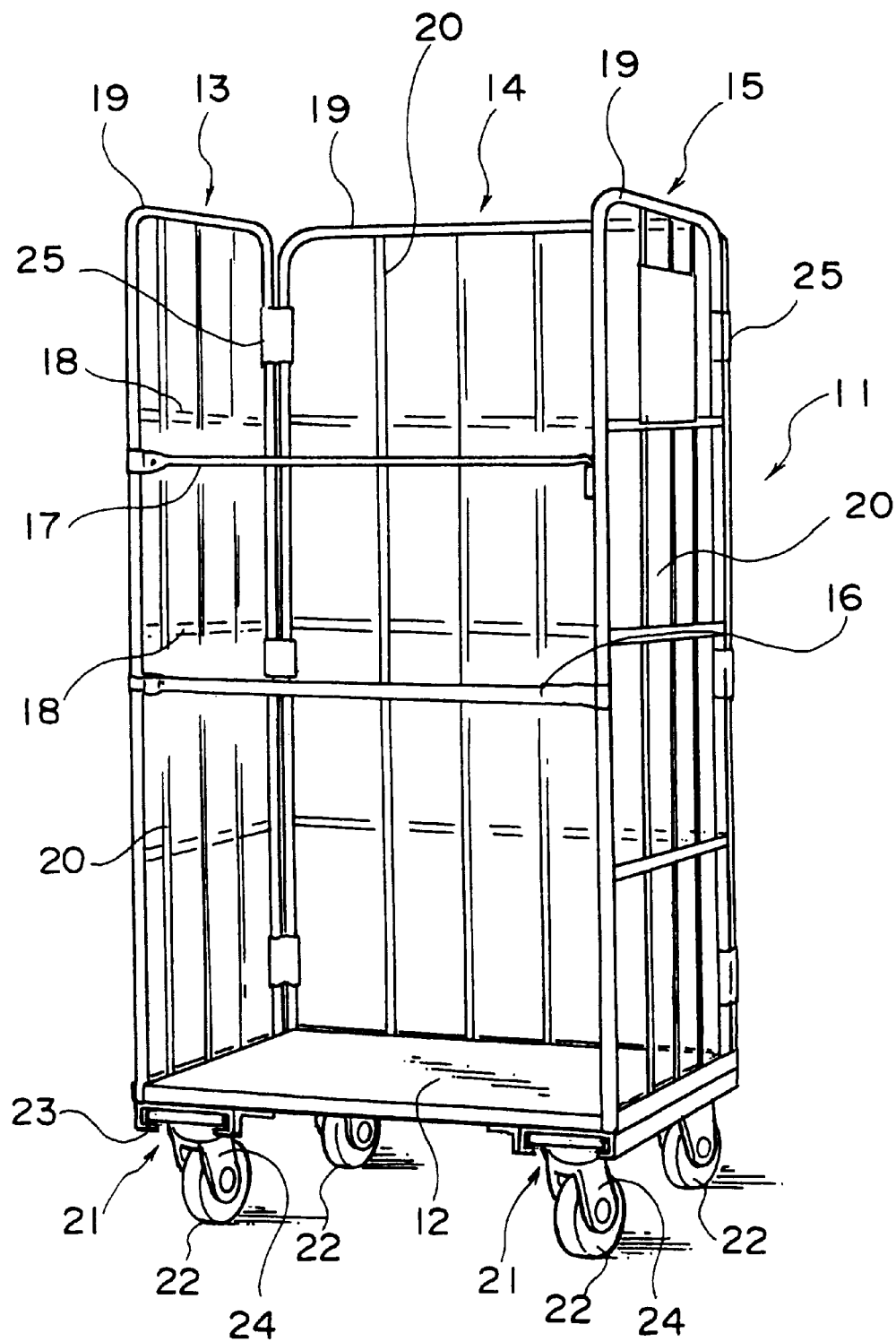
FIG. 2 is a perspective view of a container according to one embodiment of the present invention.

As further shown in FIG. 2, the base panel 12 has two casterboard holders 23, each fitted with a casterboard 21. Each casterboard 21, in turn, carries a pair of universal direction wheel holders 24 with a wheel 22 in each holder 24.

As shown in FIG. 2, one side of the cargo container should be left open for easy loading and off-loading of cargo packages. A removable strap 16 and a bar 17 serve to close the one side of the cargo container and to hold cargo packages in the container.

Vertically spaced flexible clasps 25 connect the side panels 13, 14 and 15 which should be detachable from the base panel 12 for the convenience of storage and transportation of the container itself.

Figure 4:
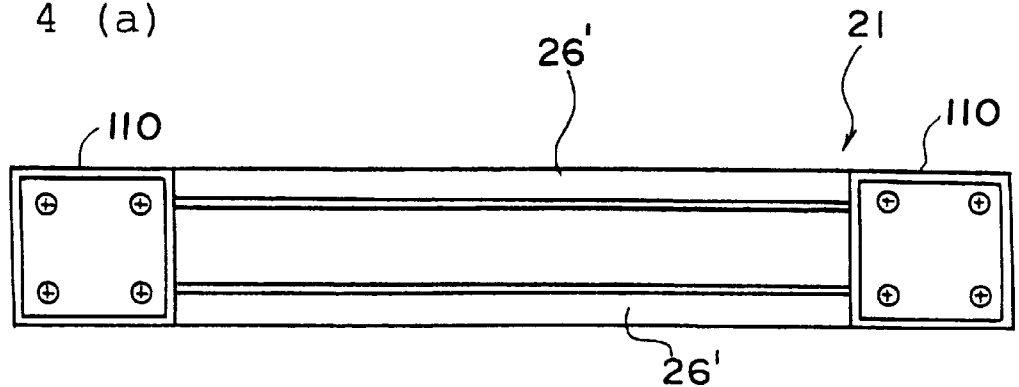
FIG. 4(a) is a plan view of a casterboard of the embodiment of FIG. 3.
FIG. 4(b) is a side view of the casterboard of FIG. 4(a)
FIG. 4(c) is a sectional view taken along line A—A in FIG. 4(b)
Figure 4:
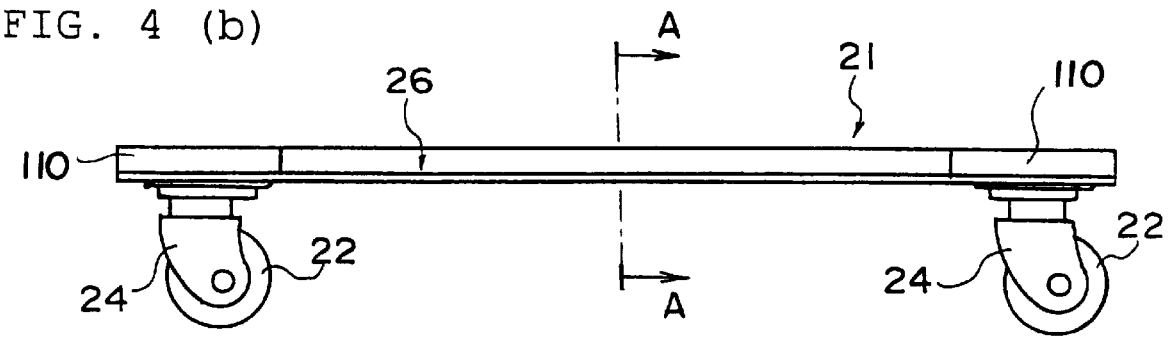
Figure 4:
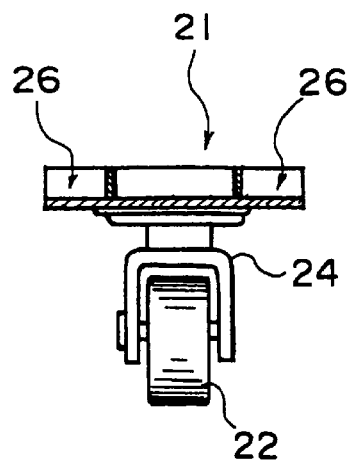
Figure 5:
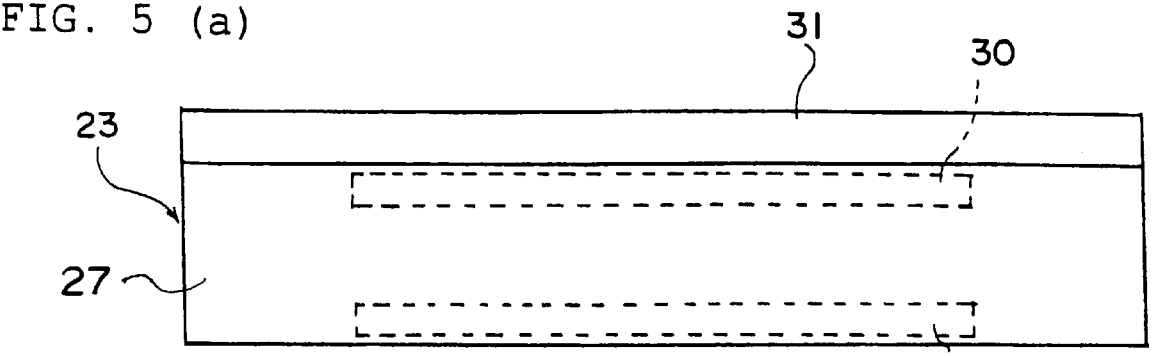
FIG. 5(a) is a plan view of a casterboard holder of the embodiment of FIG. 3.
FIG. 5(b) is a side view of the casterboard holder of FIG. 5(a)
FIG. 5(c) is a bottom view of the casterboard holder of FIG. 5(a)
FIG. 5(d) is a sectional view taken along line B—B in FIG. 5(b)
FIG. 5(e) is a sectional view taken along line C—C in FIG. 5(b)
Figure 5:
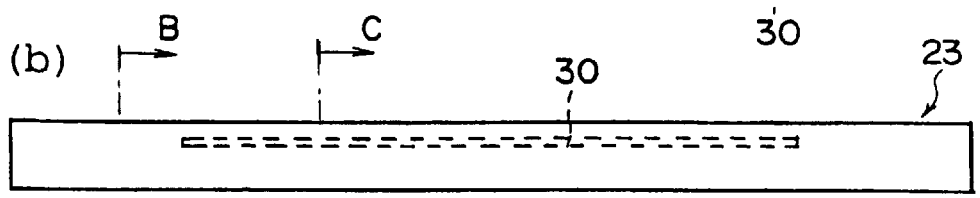
Figure 5:
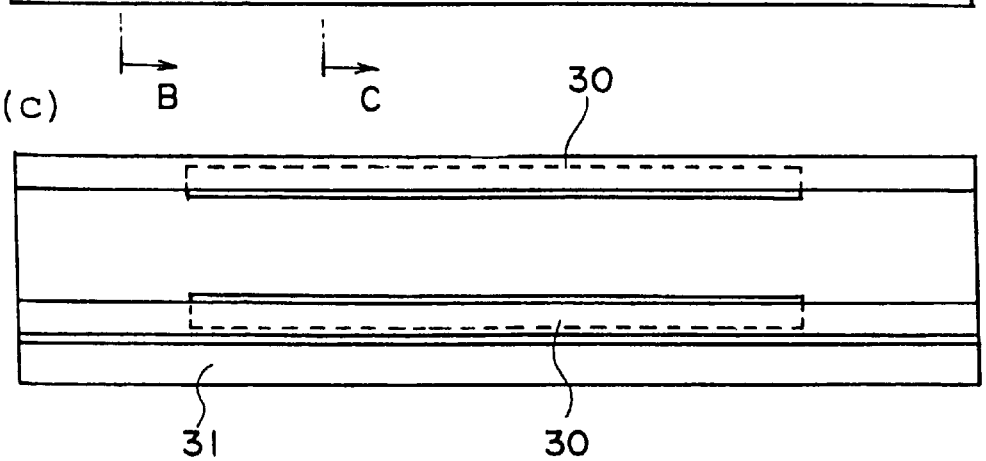
Figure 5:
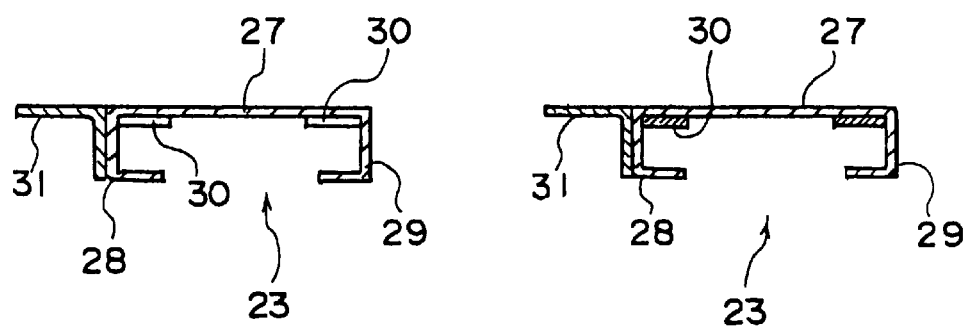

Referring to FIGS. 4(a)–4(c), each casterboard 21 is made of a steel plate 26, or a stainless steel plate or other material, and is so formed as to be held by a casterboard holder 23. The wheel holders 24 are fixed to the casterboard 21 in a conventional manner through square-shaped raised portions 110.

Figure 3:
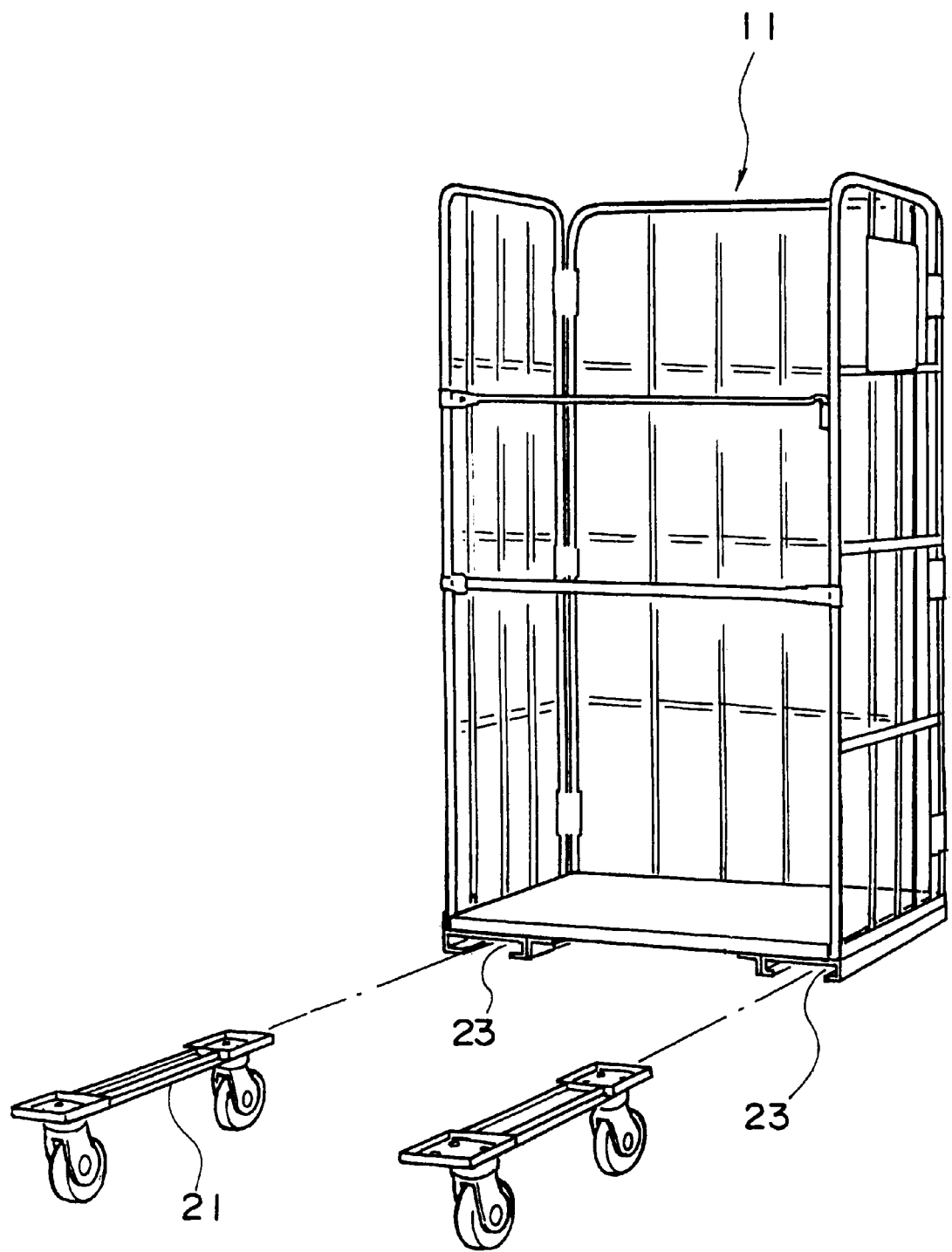
FIG. 3 is a schematic view of a container and casterboarcis therefor according to one embodiment of the present invention.

As seen in FIGS. 2 and 3, on the lower surface of the bottom wall of the container in the present invention, two casterboard holders 23 are fixed in parallel with each other. FIGS. 5(a)–5(e) show the details of the casterboard holder 23. The casterboard holder 23 is an elongated bracket having a flat portion ("first elongated portion") 27, along both sides of which two formed integral bracket portions 28 and 29, each having a generally L-shaped cross section. Provided on the lower surface of the flat portion 27 is a stopper 30 to hold the casterboard 21 in the casterboard holder 23. The stopper 30 is an elongated protrusion terminating spaced from opposing ends of the casterboard holder 23 to define spaces adjacent opposing ends of the stopper 30, each of which spaces receives a square-shaped raised portion 110. Each casterboard holder 23 has a slotted second elongated portion 231, opposite the first elongated portion 27 with a slot 232 at least partially coextensive with portion 27 and receiving wheel holders 24. The casterboard holder 23 is made of steel or other suitable material. The lip portion 31 serves to guide the container to the proper position in the apparatus for detachment of the casterboards.

Figure 6:
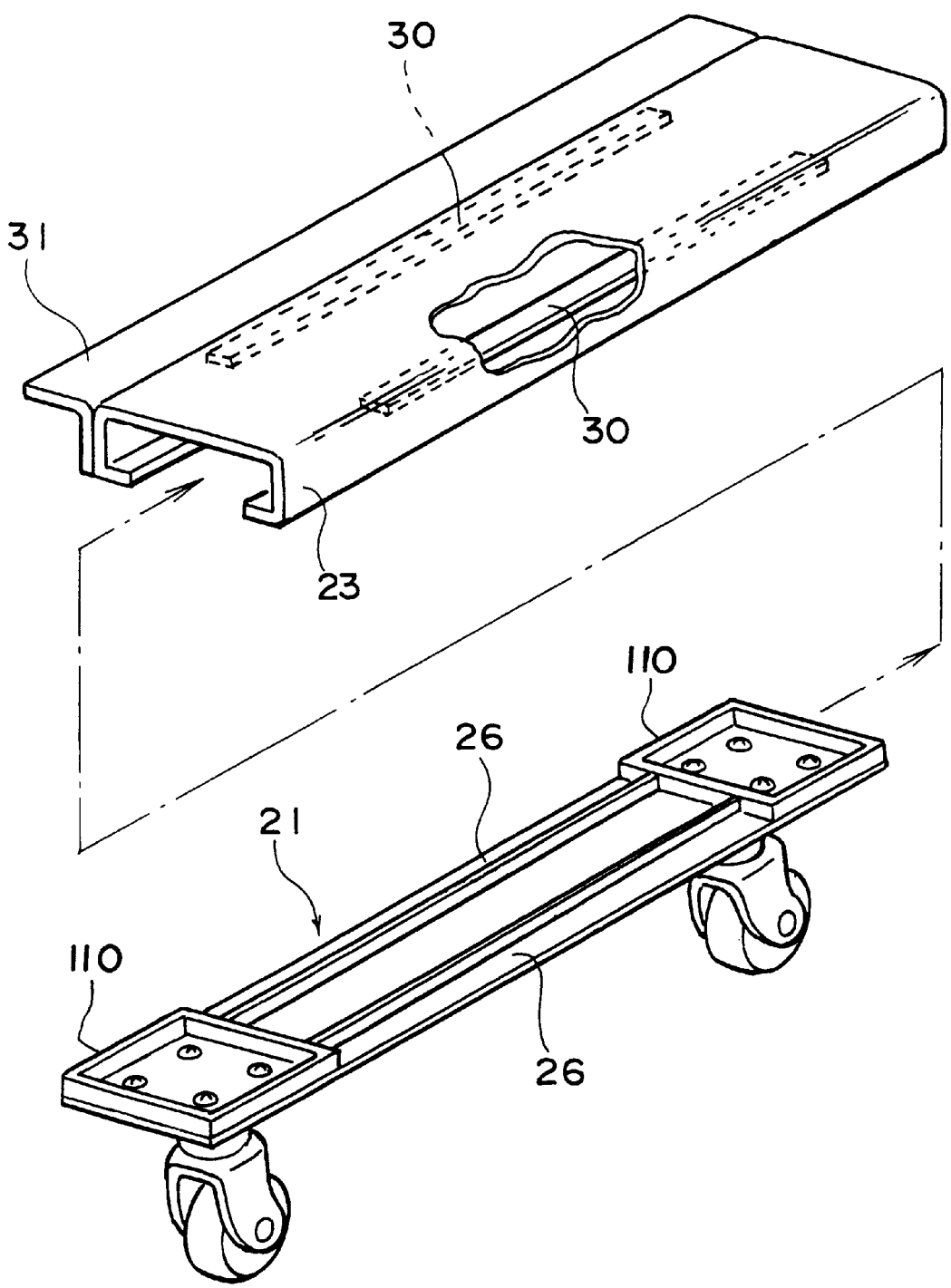
FIG. 6 is a perspective view of the casterboard of FIG. 4(a)–FIG. 4(c) and the casterboard holder of FIG. 5(a)–FIG. 5(e)
Figure 7:
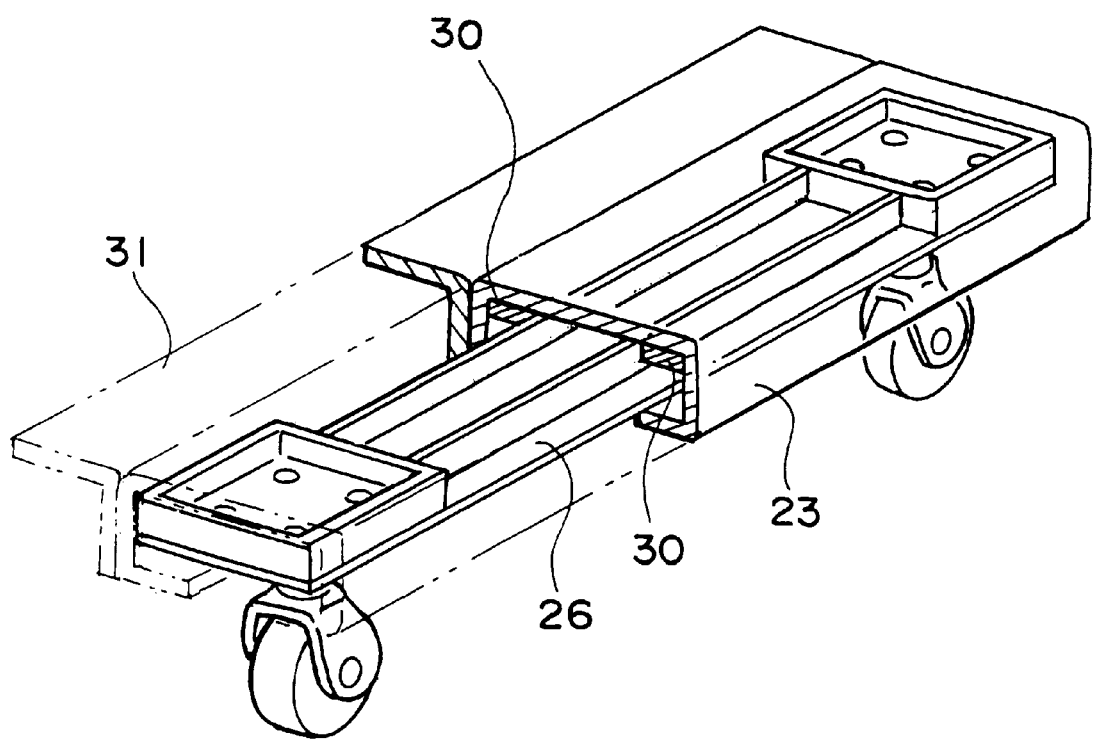
FIG. 7 shows the casterboard of FIG. 4(a)–FIG. 4(c) fitted into the casterboard holder of FIG. 5(a)–FIG. 5(e)
Figure 8:
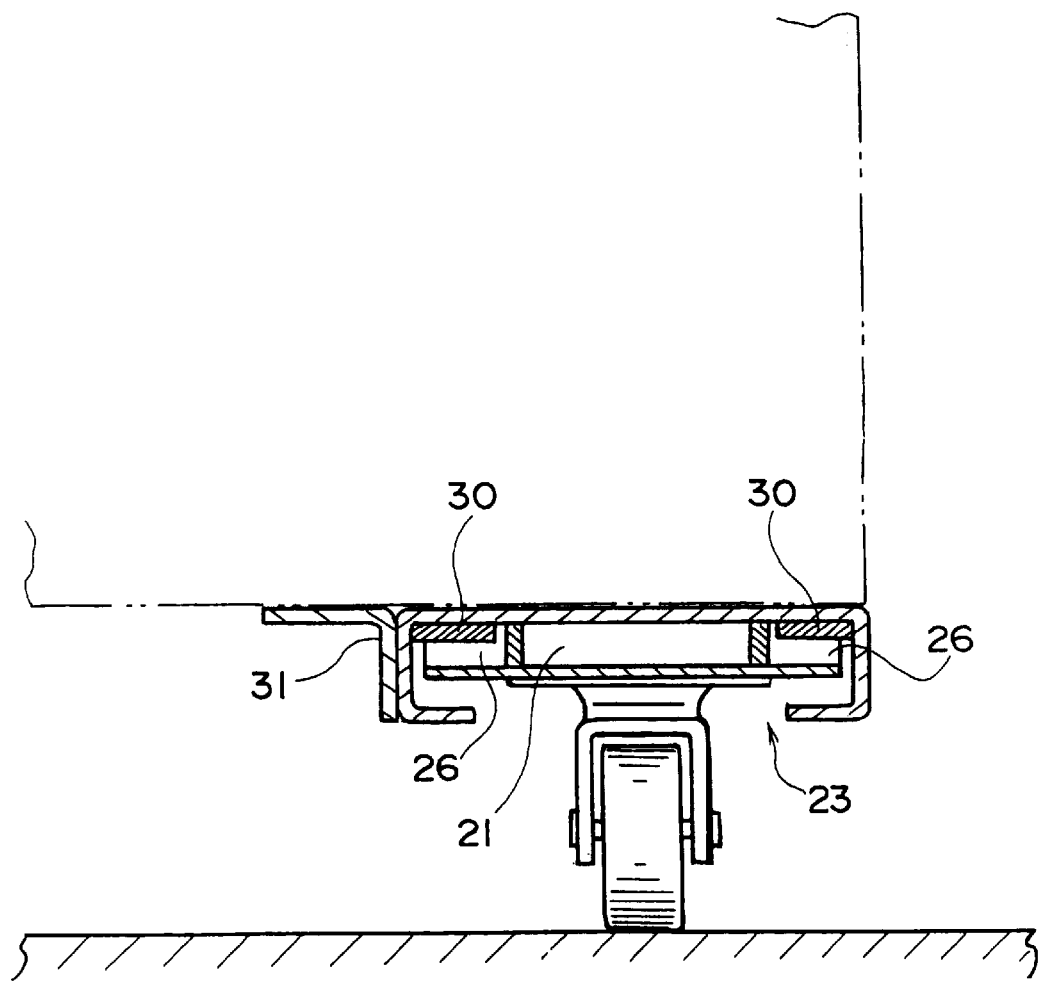
FIG. 8 is a sectional view of the assembly shown in FIG. 7.
Figure 9:
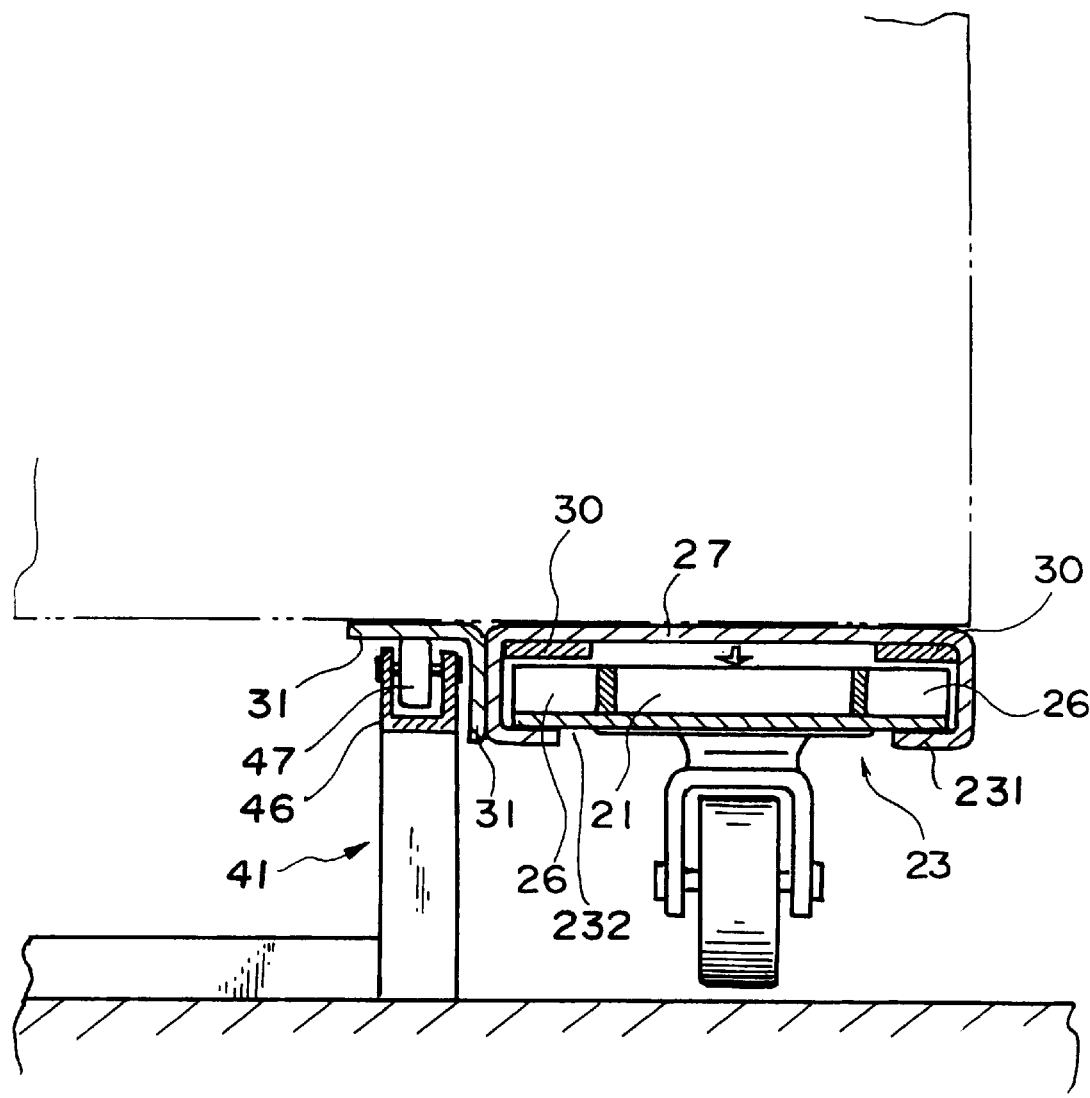
FIG. 9 is a sectional view of the assembly of FIG. 7 elevated so that the casterboard can be detached from the casterboard holder.

FIG. 6, FIG. 7 and FIG. 8 show the seating of the casterboard 21 in the casterboard holder 23. FIG. 8 is a sectional view of the casterboard 21 fully seated in the casterboard holder 23. When the container body 11 is supported by the casterboards 21 as shown in FIG. 8, each casterboard 21 is being held down by the weight of the container body and is fully seated in a castorboard holder 23. In this state ("first position") the lower surface of the casterboard holder firmly touches the upper surface of the casterboard and the stoppers 30 of the casterboard holder rest on outboard portions 26' of plate 26 of the casterboard 21. This prevents free movement or detachment of the casterboard 21 from the casterboard holder 23. To remove the casterboard 21 from the casterboard holder 23, as shown in FIG. 9, the apparatus 41 of the present invention has wheels 47 which engage lip portions 31 to hold the container body 11 with its weight off of the caster wheels 22 so that the casterboard 21 is suspended below the stopper 30 of the casterboard holder 23 (in a "second position") and becomes removable. FIG. 9, of course, depicts only one side of the container 11 and apparatus 41 which is duplicated at the other side of the container 11.

Figure 10:
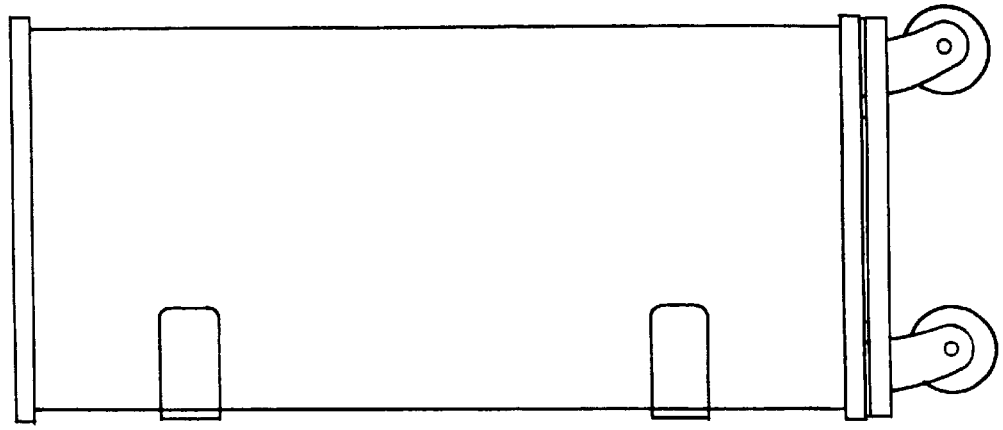
FIG. 10(a) is a front elevational view of a refrigeration container body according to another embodiment of the invention and FIG. 10(b) is a side elevational view of the same refrigeration container body.
Figure 10:
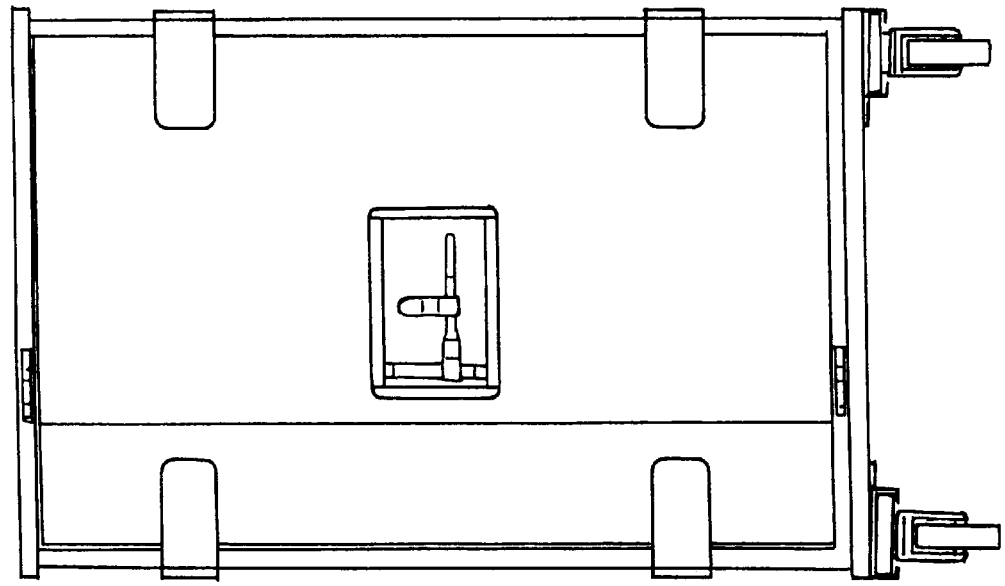

In the present invention, a variety of cargo containers may be used, for example, a refrigerated container as shown in FIGS. 10(a) and 10(b). The present invention greatly improves the reliability of a refrigerated container in transportation of temperature sensitive cargo as such cargo may be kept inside this type of refrigerated container throughout the journey, from door to door, without changes of containers for different phases of transportation.

Figure 11:
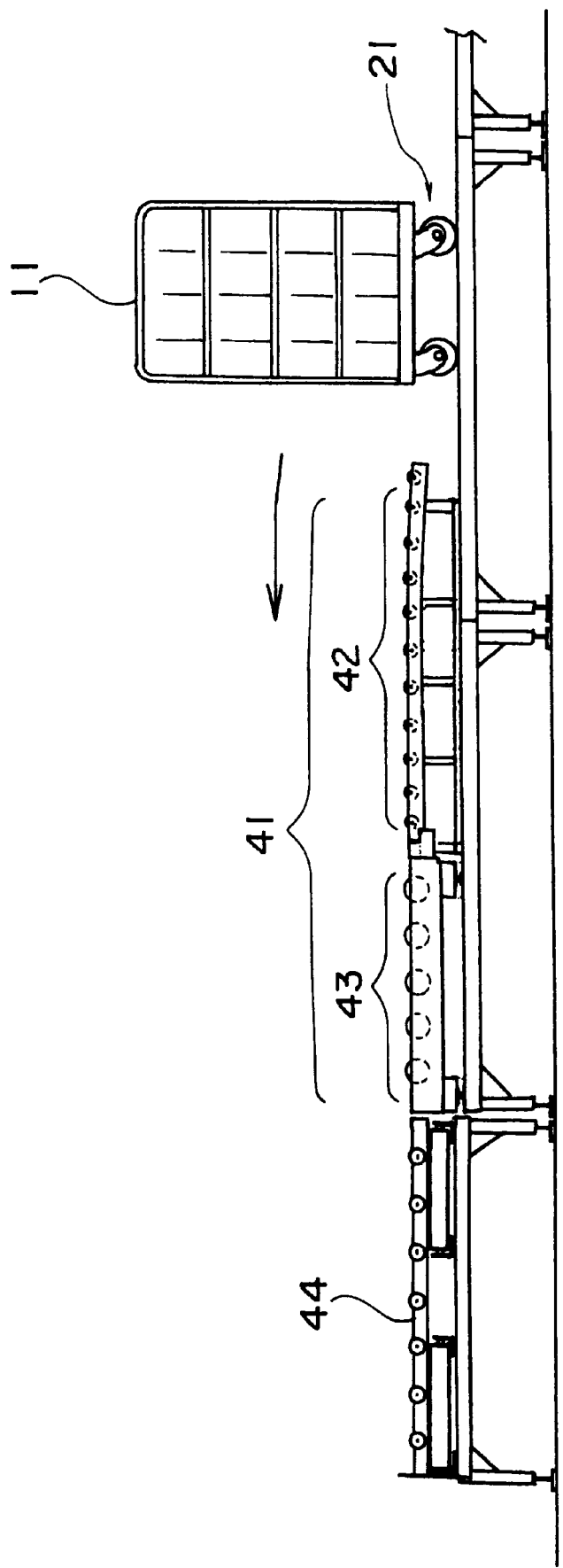
FIG. 11 is a side elevational view of an apparatus for attaching and detaching casterboards from a container in the present invention.
Figure 12:
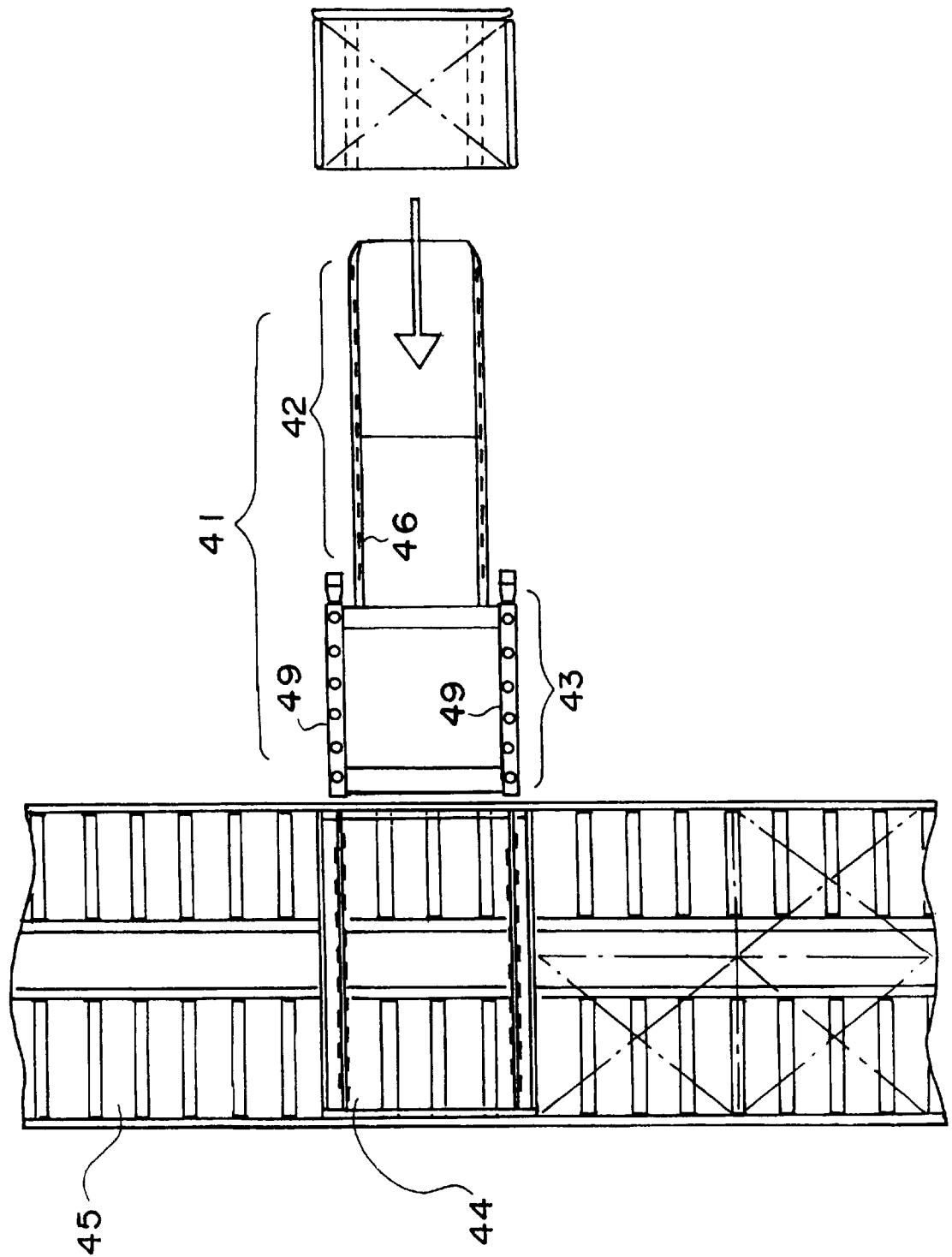
FIG. 12 is a plan view of the apparatus shown in FIG. 11.

FIG. 11 is a side view of the apparatus 41 attaching the casterboards 21 to and detaching them from the casterboard holders 23 of a container of the present invention. FIG. 12 is a corresponding plan view. As shown in FIGS. 11 and 12, conveyor apparatus 41 consists of two conveyor sections, 42 and 43. The conveyor section 42 is for attaching the casterboards 21 to and detaching them from a container 11 of the present invention, and the conveyor section 43 is for transferring the container 11 without casterboard 21 from the conveyor section 42 to conveyor section 44, or vice versa. The conveyor section 44 receives a container after its casterboards 21 are detached by the conveyor apparatus 41, or delivers a container without casterboards to the conveyor apparatus 41 for attachment of the casterboards. The conveyor 45 is a roller conveyor system for moving the conveyor section 44 thereon. When the system and equipment of the present invention is used for transportation of cargo by air, the conveyor section 44 would be an air cargo pallet or an air cargo container that meets special requirements for being loaded directly into an aircraft cargo compartment. Such an air cargo pallet or an air cargo container 11 accommodates a certain number of containers of the present invention after their casterboards are detached by the conveyor apparatus 41 and is moved on the roller conveyor 45 for storage until being loaded into an aircraft.

The conveyor section 42 has a pair of rails 46 on which a number of rollers 47 are provided in a line. These rails with rollers serve to guide the container to the conveyor section 43 while supporting it at the portion 31 of the casterboard holder 23, as shown in FIG. 9.

Figure 13:
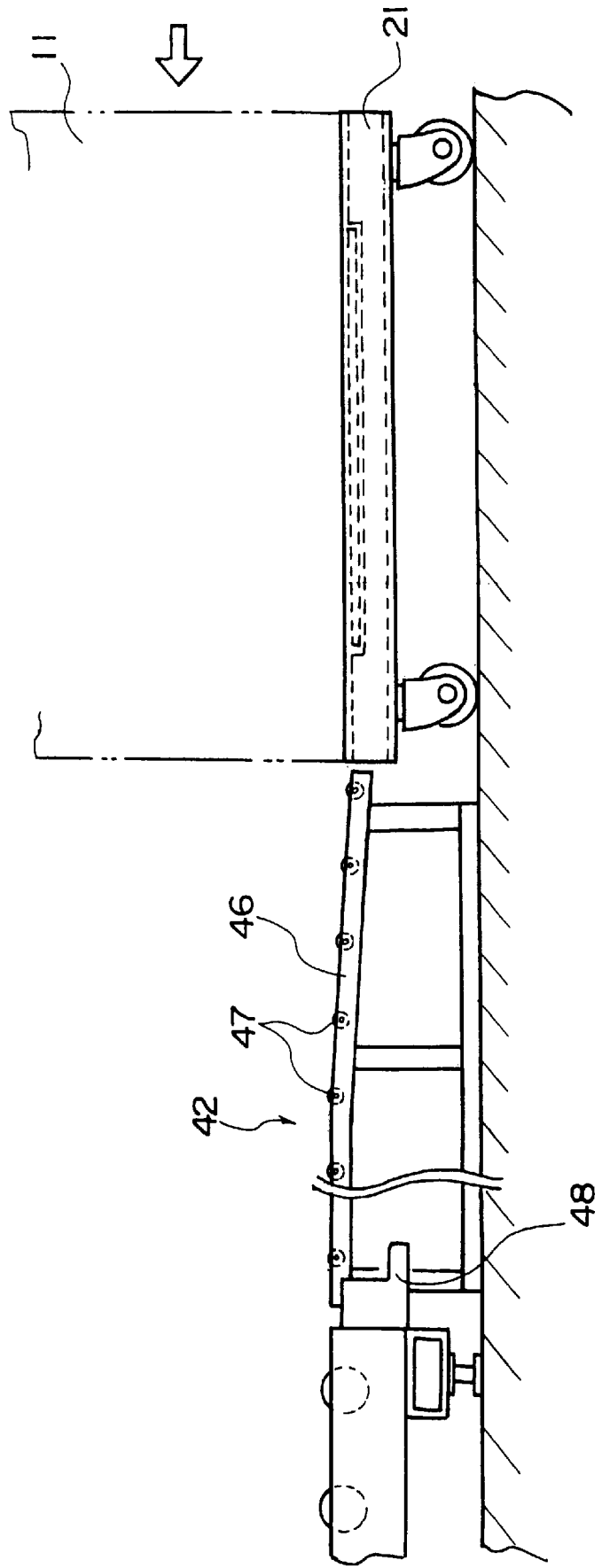
FIGS. 13, 14, 15 and 16 are side elevational views respectively illustrating a sequence of steps in the process of detachment of a casterboard from a container.
Figure 14:
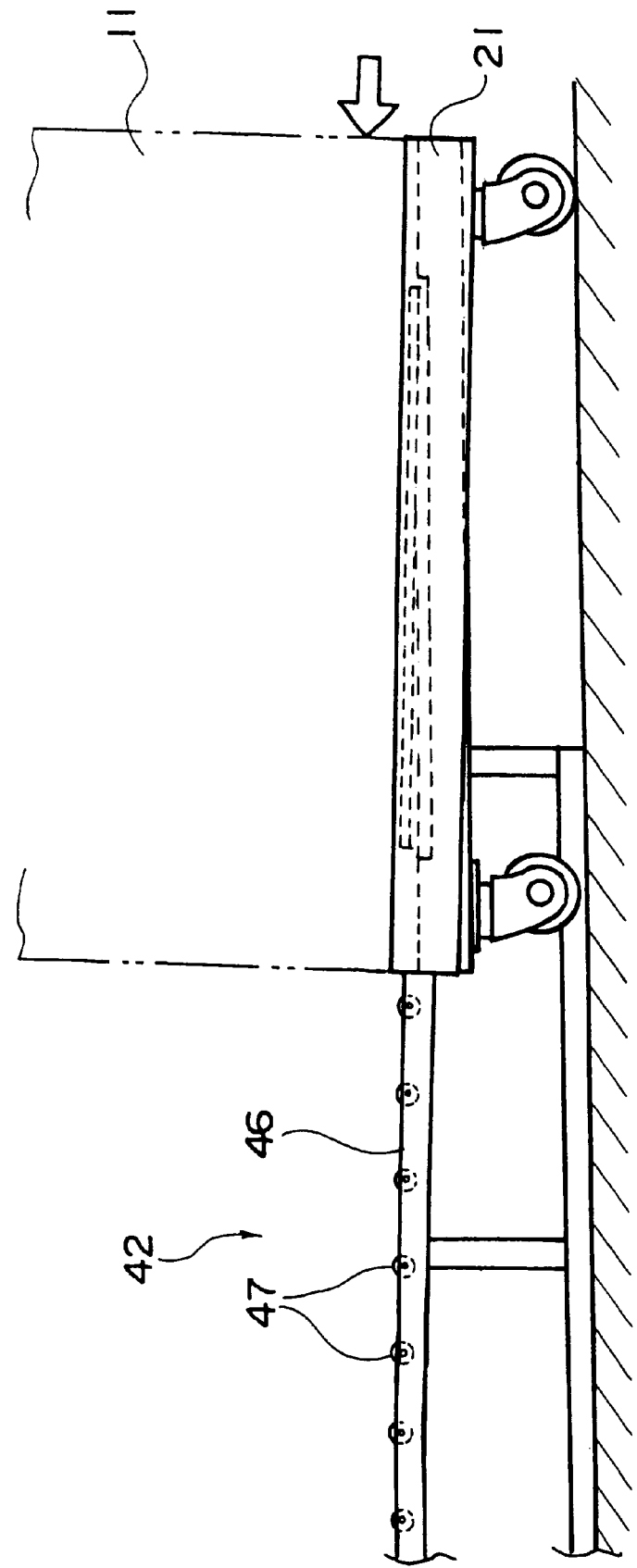
Figure 15:
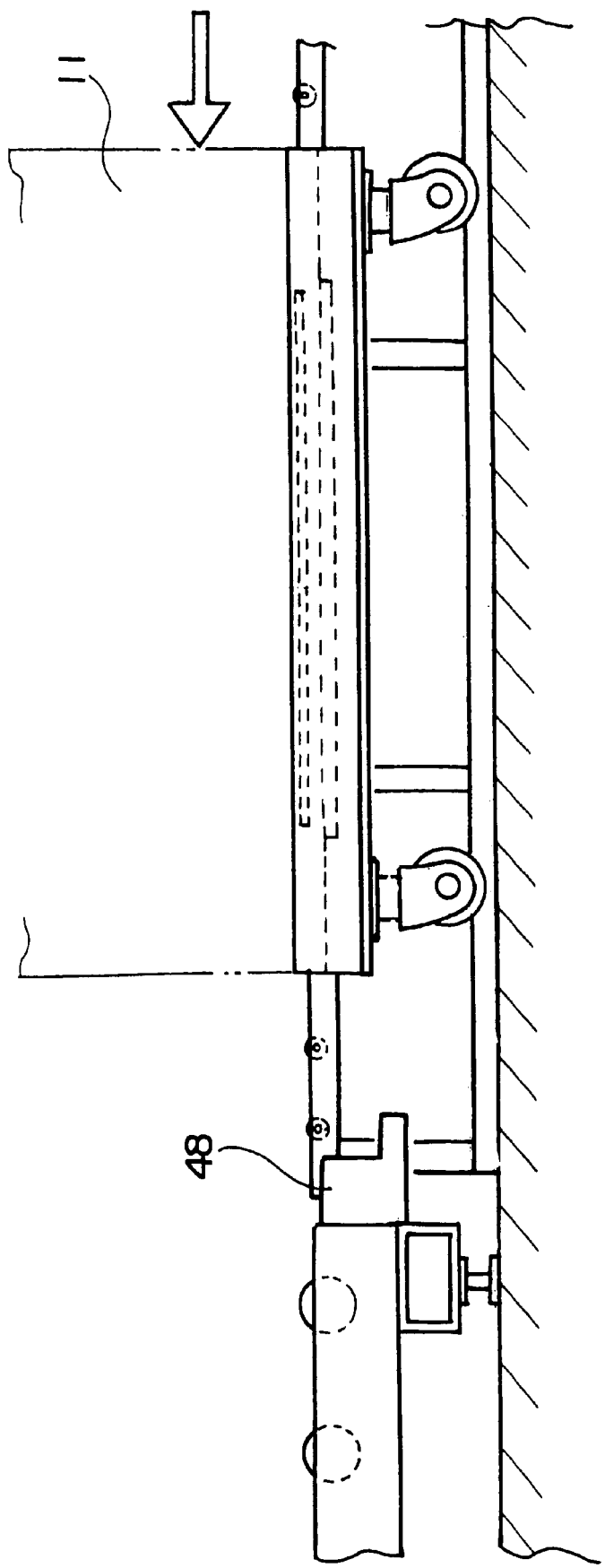

As shown in FIG. 13, the rails at the rear of conveyor section 42 are higher than at the front end in order to lift the container body as shown in FIGS. 13, 14 and 15 in sequence, and to finally free the casterboard 21 from the casterboard holder 23 at the position shown in FIG. 9 ("second position").

Figure 16:
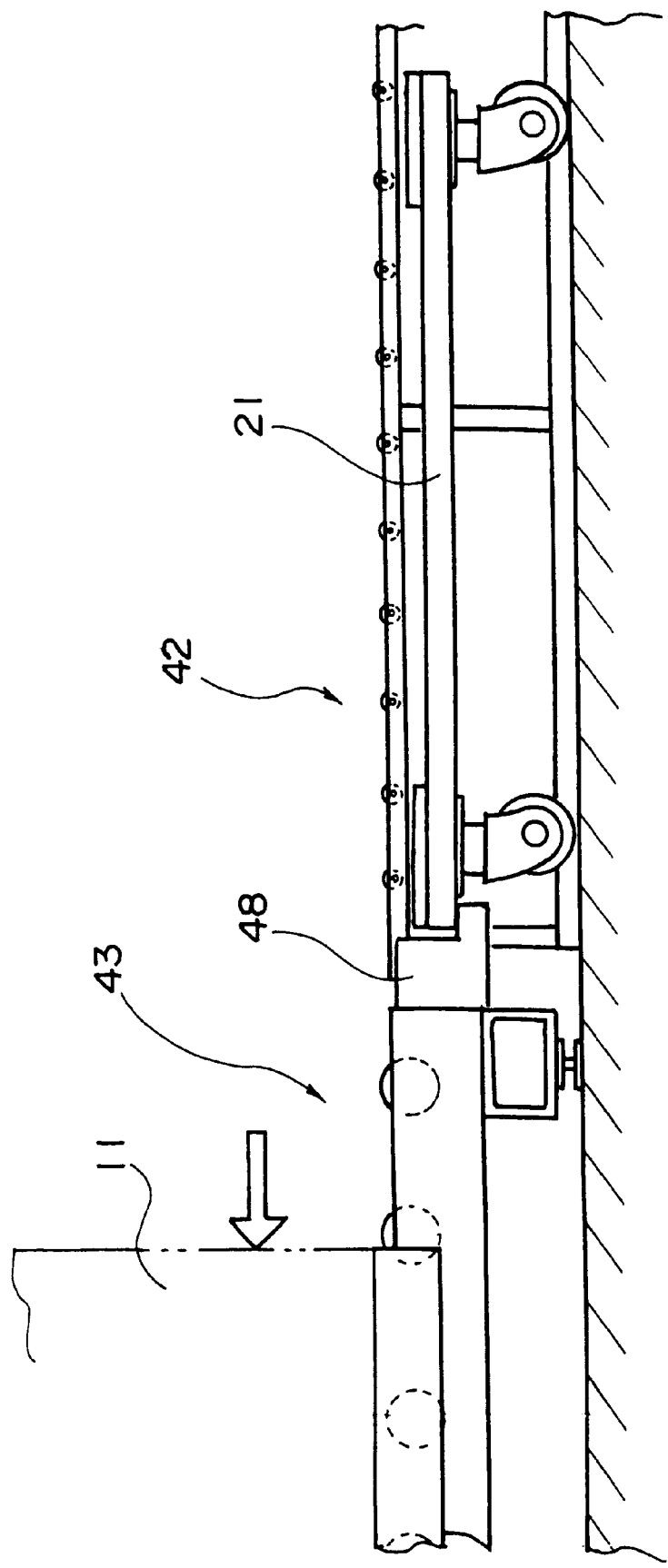
Figure 19:
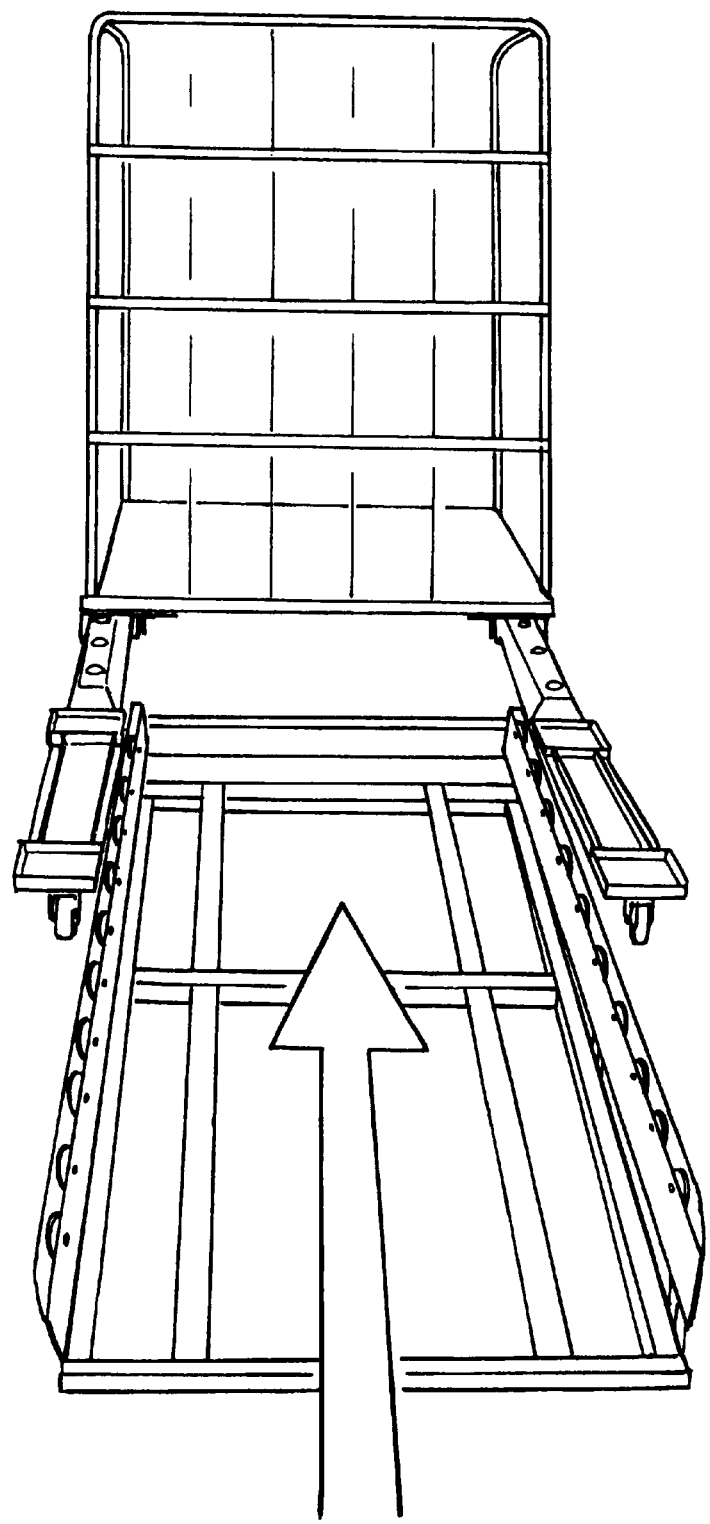
FIG. 19 is a perspective view showing a container supported by guide rails with its casterboards detached.

As shown in FIGS. 15 and 16, a stopper 48 is installed at the rear end of the rail 46 in order to stop the casterboard 21 while the container body continues movement toward conveyor section 43, as shown in FIGS. 16 and 19.

Figure 17:
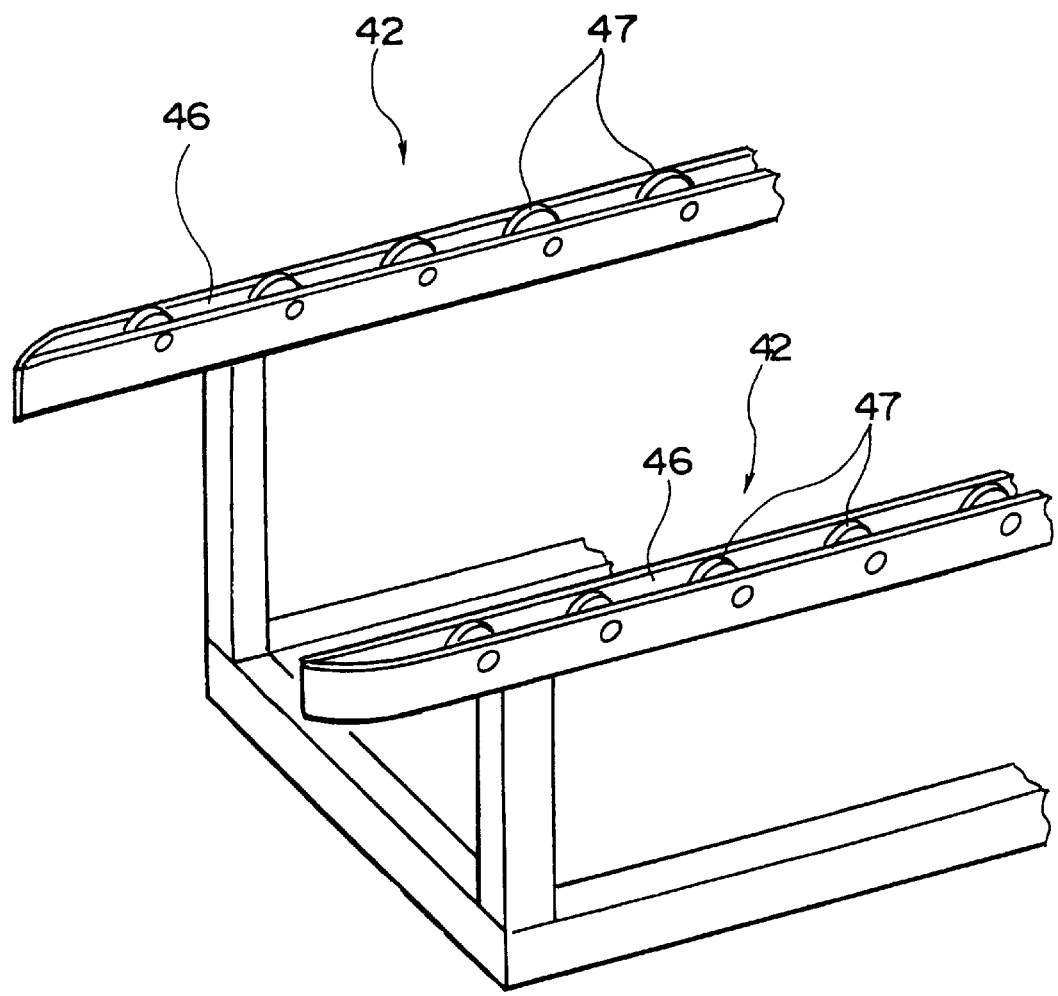
FIG. 17 is a perspective view of rail ends which guide containers onto and off of the apparatus of FIG. 11.

The front end of each rail 46 is tapered as shown in FIG. 17 for easy mounting of the container on the apparatus.

Figure 18:
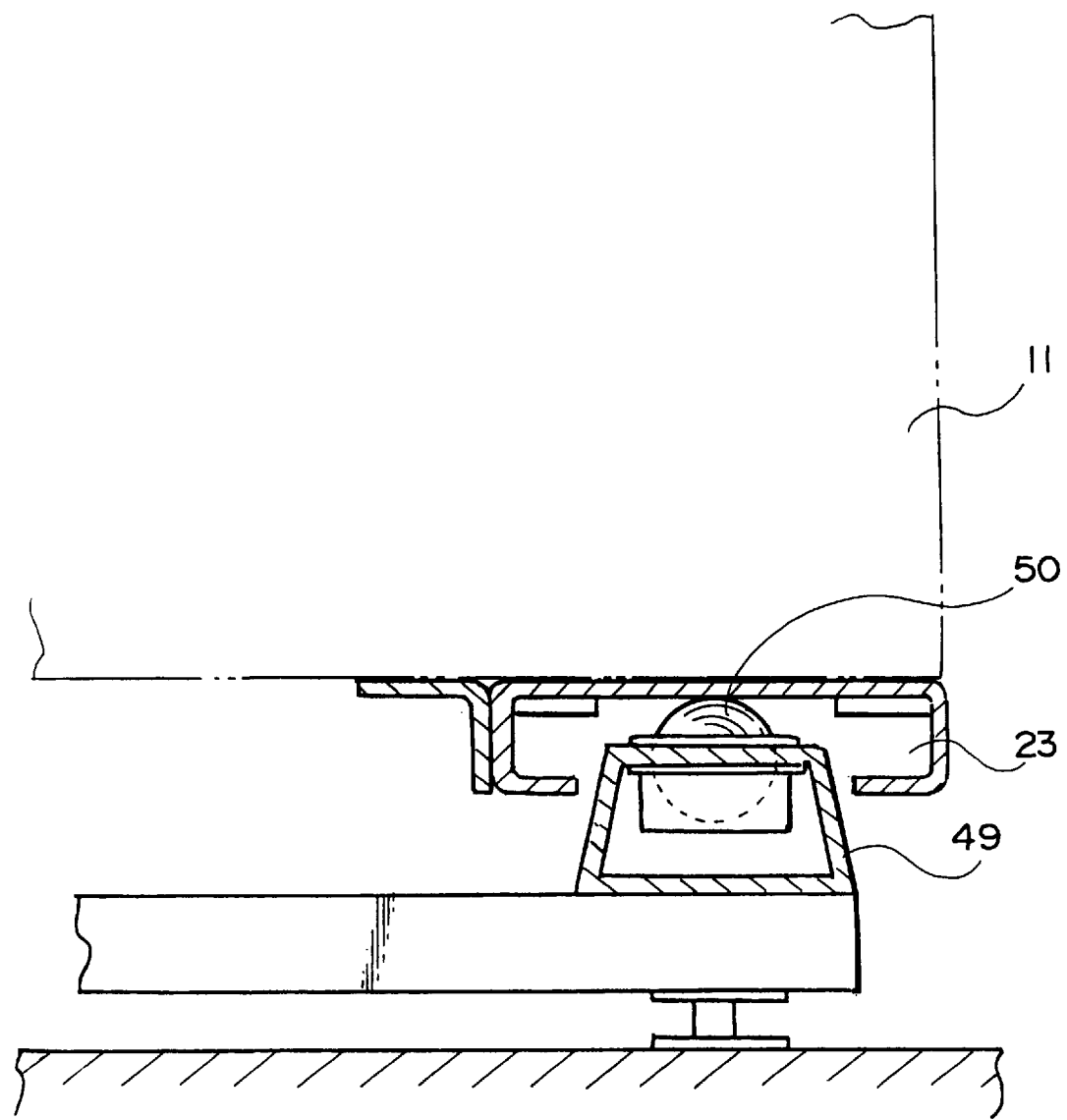
FIG. 18 is a sectional view of a guide rail of the apparatus of FIG. 11, shown supporting a container through its casterboard holder ("second position")

Conveyor section 43 has a pair of roller rails 49 which are spaced wider than the rails 46 of the conveyor section 42, as shown in FIGS. 12 and 19. Ball bearings 50 may be used instead of rollers as shown in FIG. 18. The rails 49 support the container body 11 at the casterboard holders 23 with the casterboards 21 removed and guide the container onto the conveyor section 44.

The casterboards 21 are detached from the casterboard holders 23 in the following steps:

1. A container 11 with casterboards 21 attached is manually pushed in the direction of arrow in FIG. 13 onto the roller rails 46 of the conveyor section 42 as shown in FIG. 14.
2. The container 11 with casterboards 21 attached is elevated on the roller rails as shown in FIGS. 14 and 15.
3. The container 11 will continue to move toward the conveyor section 43 while the casterboards 21 are held by the stopper 48 and left behind the container body 11, as shown in FIGS. 16 and 19.

4. The container 11 without casterboards 21, being supported by the rails 49 as shown in FIG. 18, will then be transferred to the conveyor section 44.

The casterboards 21 are attached to a container in the reverse order of the steps described for detachment. Holders should be provided to keep the casterboards 121 stable in proper position for fitting into the casterboard holders 23.

The components, materials of the components and features and shapes of components described above are merely exemplary and a variety of modifications and changes can be made consistent with the present invention.

Figure 21:
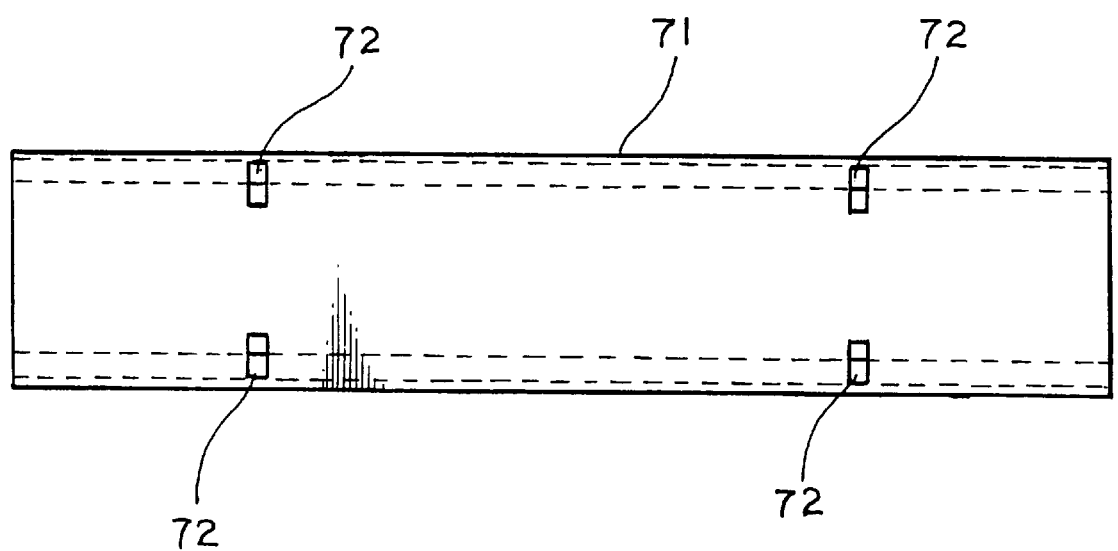
FIG. 21 is a plan view of another embodiment of a castorboard holder in accordance with the invention.
Figure 22:
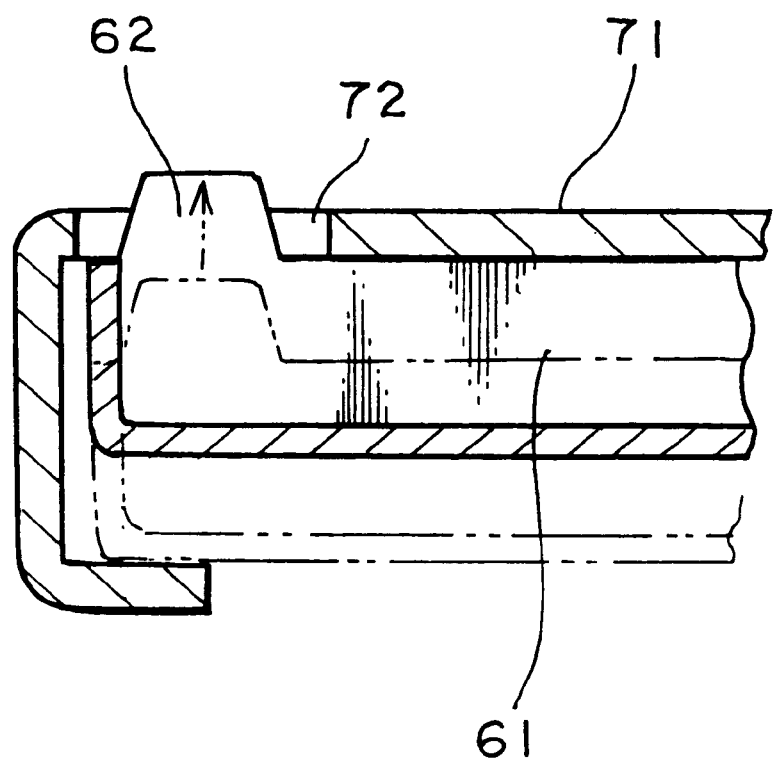
FIG. 22 is a partial sectional view showing engagement ("first position") of the casterboard of FIGS. 20(a)–20(c) and the casterboard holder of FIG. 21.
Figure 23:
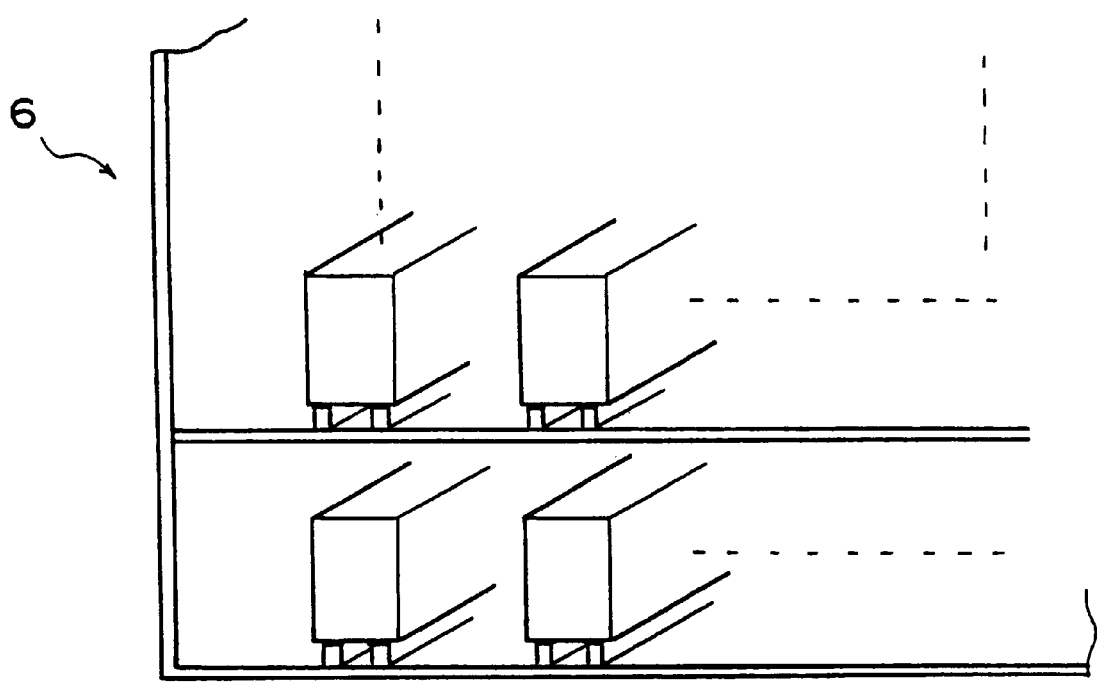
FIG. 23 is a perspective view showing a storage rack system for stacking the containers several high, with the casterboards detached from the containers.
Figure 25:
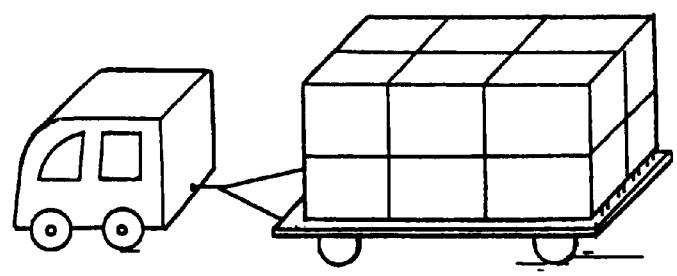
FIG. 25 illustrates a truck loaded with containers being transported, with the casterboards detached from each container.
Figure 24:
FIG. 24 is a perspective view of an embodiment wherein the containers are stored in showcases with the casterboards detached from each container.

For example, the casterboard and casterboard holder may be of the shape as shown in FIG. 20 through FIG. 22. FIGS. 20(*a*)–20(*c*) show four projections 62 on the base 61 of the casterboard. Four slots 72 are provided in the casterboard holder 71 to receive the projections 62. As shown in FIG. 22, the projections 62 are engaged in the slots 72 under the weight of the container itself, while the container is supported by the casterboards and wheels ("first position"). When the container is lifted, the projections 62 will come out of the slots 72 for detachment, as shown with dotted lines in FIG. 22 ("second position").

Cargo packed in a container as provided in the present invention can be carried by any type of transportation including aircraft, can be stored in a warehouse, displayed in a showcase, and handled in various phases of a distribution system, without requiring transfer to another container. Thus, the present invention realizes quick and smooth handling with minimal manpower and contributes to cost and time savings and improved quality in cargo transportation and handling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A cargo handling system comprising:
   a cargo container having a bottom wall;
   at least one casterboard comprising at least two wheels;
   casterboard holder means, fixed to said bottom wall, for detachably holding said casterboard by the weight of said cargo container for movement with said cargo container;
   a ramp for receiving said cargo container and providing an inclined support for said cargo container whereby said cargo container can be elevated and supported with said casterboard free of the weight of said cargo container for removal of said casterboard; and
   a conveyor for receiving, from said ramp, said cargo container free of said casterboard.

2. A cargo handling system according to claim 1 wherein said inclined support is formed of a pair of rails, said rails supporting roller members which engage the bottom wall of said cargo container.

3. A cargo holding system according to claim 1 wherein said ramp is provided with at least one fixed stopper for engaging and stopping said casterboard in movement of said cargo container on said ramp, toward said conveyor, whereby said movement of said cargo container toward said conveyor separates said casterboard from said casterboard holder means.

4. A cargo handling system according to claim 1 wherein said casterboard holder means holds said casterboard in a first position with the weight of the cargo container on said casterboard, said casterboard being locked against sliding movement relative to said casterboard holder means in said first position, and in a second position with said casterboard free of the weight of said cargo container, said casterboard being suspended within said casterboard holder means in said second position, said second position of said casterboard being vertically lower, relative to said casterboard holder means, than said first position and allowing sliding movement of said casterboard relative to said casterboard holder means.

5. A cargo handling system according to claim 4 wherein said casterboard holder means is an elongated bracket defining an elongated channel for slidably receiving said casterboard, said bracket defining a first elongated surface at said bottom wall and a second elongated surface, opposite said first elongated surface, said second elongated surface having a slot at least partially coextensive therewith, said slot accommodating holders for said plural wheels.

6. A cargo handling system according to claim 5 wherein said casterboard has raised portions at opposing ends, on a surface thereof opposing said plural wheels; and wherein said elongated bracket comprises an elongated protrusion extending from said first surface and terminating spaced from opposing ends of said elongated bracket to define a space at each of opposing ends of said first surface, said raised portions of said casterboard seating within said spaces in said first position.

7. A cargo container comprising:
   a bottom wall and side walls mounted on said bottom wall;
   at least one casterboard comprising plural wheels;
   at least one casterboard holder fixed to said bottom wall for slidably receiving said casterboard, said casterboard holder holding said casterboard in a first position with the weight of the cargo container on the said casterboard, said casterboard being locked against sliding movement relative to said casterboard holder in said first position, and in a second position with said casterboard free of the weight of the cargo container, said casterboard being suspended within said casterboard holder in said second position, said second position of said casterboard being vertically lower, relative to said casterboard holder, than said first position and allowing sliding movement of said casterboard relative to said casterboard holder.

8. A cargo container according to claim 7 wherein said casterboard holder is an elongated bracket defining an elongated channel for slidably receiving said casterboard, said bracket defining a first elongated surface at said bottom wall and a second elongated surface, opposite said first elongated surface, said second elongated surface having a slot at least partially coextensive therewith, said slot accommodating holders for plural wheels.

9. A cargo container according to claim 8 wherein said casterboard has raised portions at opposing ends, on a surface thereof opposing said plural wheels; and wherein said elongated bracket comprises an elongated protrusion extending from said first surface and terminating spaced from opposing ends of said elongated bracket to define a space at each of opposing ends of said first surface, said raised portions of said casterboard seating within said spaces in said first position.

* * * * *